Figure 1:
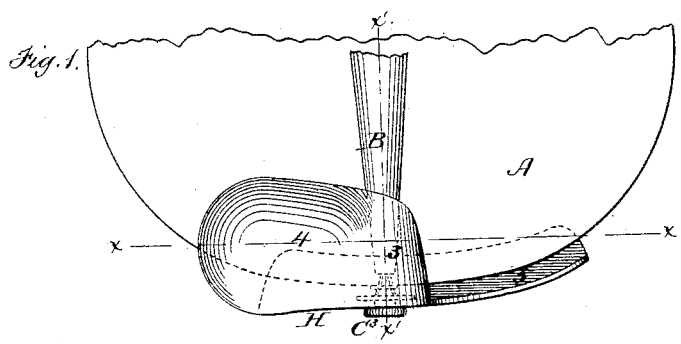

2 Sheets—Sheet 1.

O. BULL.
Insulating Attachment for Violins.

No. 217,330. Patented July 8, 1879.

Witnesses.
Geo. W. Pierce.
C. H. Pope.

Inventor
Ole Bull
by Wright & Brown
Attys.

2 Sheets—Sheet 2.
O. BULL.
Insulating Attachment for Violins.
No. 217,330. Patented July 8, 1879.
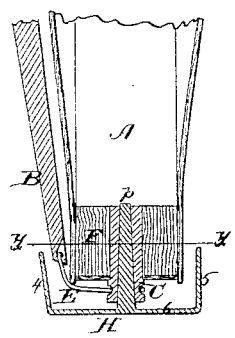
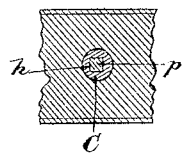
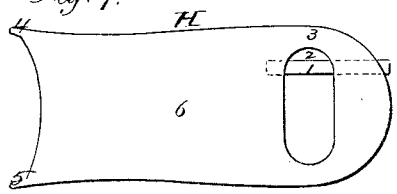
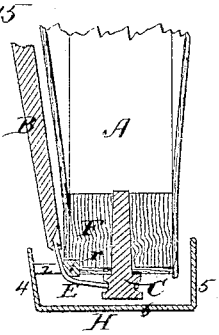
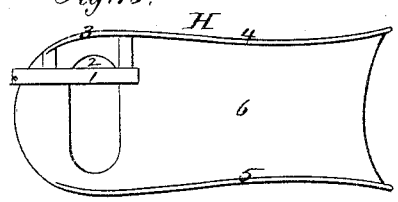
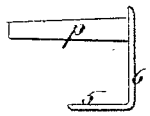
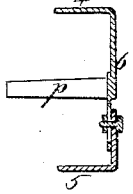
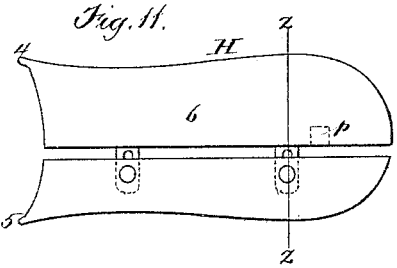
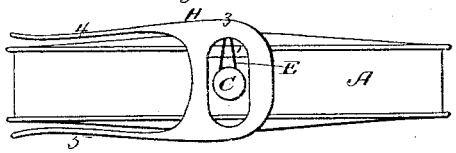
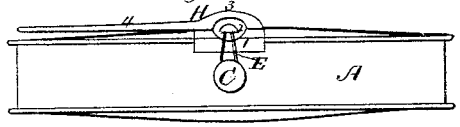
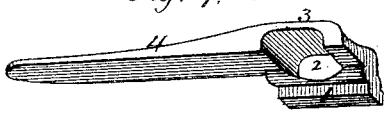
Witnesses.
Geo. W. Pierce.
O. W. Pope.
Inventor
Ole Bull
by Wright Brown
Attys.
N. PETERS, PHOTO-LITHOGRAPHER, WASHINGTON, D C.

UNITED STATES PATENT OFFICE.

OLE BULL, OF BERGEN, COUNTY OF OOS, NORWAY.

IMPROVEMENT IN INSULATING ATTACHMENTS FOR VIOLINS.

Specification forming part of Letters Patent No. 217,330, dated July 8, 1879; application filed April 19, 1879.

*To all whom it may concern:*

Be it known that I, OLE BULL, of Bergen, in the county of Oos and Kingdom of Norway, have invented certain Improvements in Insulating Attachments for Violins, of which the following is a specification.

I have found in many years of constant practice and careful study of the violin that, in order to bring out most perfectly its capacities for fine tone and expression, there must be no interference with the resonance or vibrations of its body. The contact of the player's clothing and chin with the body of the violin held in the usual manner partially muffles the instrument and interferes with its resonance, and as the violin is usually held in such position that the clothing and chin are in contact with it only at one side of its longitudinal center, it follows that the equilibrium of the instrument is disturbed, the vibrations of only one side or half being affected without a corresponding interference with the vibrations of the opposite half. These causes—viz., the interference with the vibrations and the disturbance of the equilibrium—so affect the tones of the instrument that to a trained and sensitive ear the poetic feeling or expression of a performance is often marred. A detachable chin-rest has been provided, which has to be clamped to the violin at one side only of the longitudinal center; but this device, being in contact with the resonant portion of the violin, interferes both with the vibrations and the equilibrium, and does not keep the player's clothing from contact with the instrument.

There is in every violin a block or piece called the "stay-block," which is located inside the instrument, and is glued firmly to the top, bottom, and end pieces, and receives the pin or peg which holds the loop of the tail-piece. It is obvious that the portions of the violin which are backed by this block are not resonant, the block being of considerable size, and thus imparting stiffness to the parts in contact with its surface. This stiffness is increased by the pressure exerted on the instrument at this point by the tension of the strings, which amounts to nearly or quite one hundred pounds.

My invention consists in an attachment formed to bear only upon this non-resonant portion of the violin and insulate the adjoining resonant portions of the violin from the chin or from the clothing of the player, or from both, and thus prevent any interference with the resonance or vibrations and equilibrium of the instrument, as I will now proceed to describe.

Figure 2:
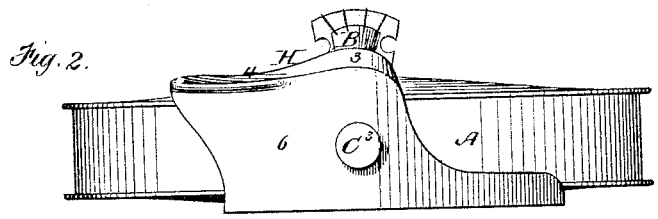
Figure 3:
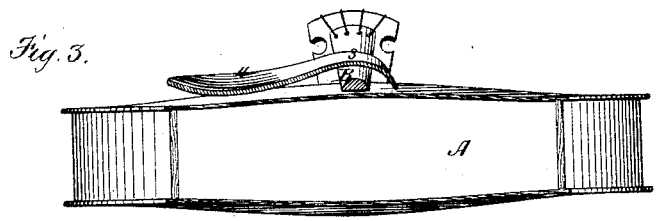
Figure 4:
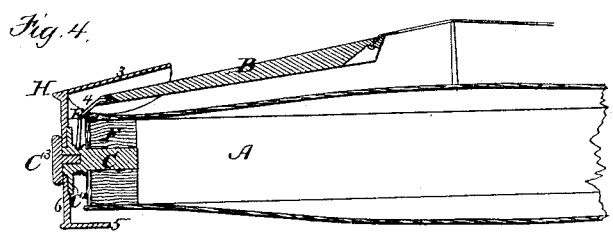
Figure 5:
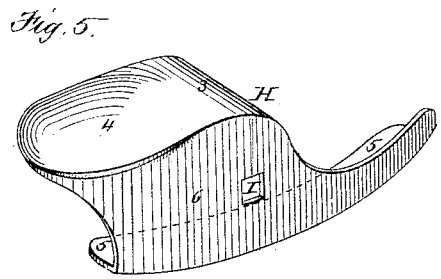
Figure 6:
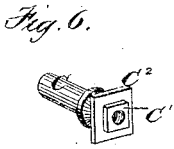

Of the accompanying drawings, forming a part of this specification, Figure 1 represents a top view of a portion of a violin provided with my improved attachment. Fig. 2 represents an end view of the same. Fig. 3 represents a section on line $x\,x$, Fig. 1. Fig. 4 represents a section on line $x'\,x'$, Fig. 1. Fig. 5 represents a perspective view of the attachment removed. Fig. 6 represents a perspective view of the tail-piece peg. Figs. 7, 8, 9, 10, 11, 12, 13, 14, 15, 16, and 17, Sheet 2, represent various modifications of the form of the attachment and the means for attaching the same to a violin.

Similar letters of reference indicate like parts in all the figures.

In the drawings, A represents the body of the violin. B represents the tail-piece, to which the strings are attached. C represents the peg to which the loop E of the tail-piece is attached, and F represents the stay-block, which is located inside the body of the violin in such position as to receive the peg C, and is glued firmly to the top, bottom, and end of the violin, as usual. H represents my improved attachment, the essential features of which consist in the peculiar construction of parts, whereby when the attachment is applied to a violin it shall touch or bear upon only the portion of the violin that is backed by the stay-block and form one or more guards or rests which project over and are insulated or isolated from the adjoining resonant portions of the violin. This attachment may be made of wood, hard rubber, metal, or any suitable material, and may be attached in any desired manner to the specified portion of the violin. I prefer to construct the attachment so that it will protect and insulate both sides of the violin, and will be capable of being readily applied and removed.

In Sheet 1 of the drawings I have shown the attachment and means for applying the same to a violin in as simple, convenient, and practical form as I am at present aware of. This form of the attachment is preferably made of wood or other light yet rigid material, and is composed of a central web or plate, 6, (adapted, as hereinafter described, to be securely attached to the specified portion of a violin, so as to stand about parallel with the end thereof,) and tongues or rests 4 5, adapted respectively to project over and under the resonant portions of the instrument adjoining the non-resonant portion to which the web or plate 6 is attached, said parts being so formed that when attached to the violin they will not touch nor be in contact with any portion of the instrument excepting that backed by the stay-block.

The tongue or rest 4 projects over the resonant portion of the violin, on which the player's chin naturally rests, and is preferably hollowed or concaved on its upper surface to fit the chin. One end of the rest 4 is preferably extended to form a bridge or guard projecting over and protecting the end of the tail-piece without touching the same, so that the player's chin cannot come in contact with the tail-piece. Such contact is objectionable for the reason that it interferes with the vibrations.

The tongue or rest 5 projects under the resonant portion of the instrument, which naturally rests on the player's coat, and keeps the violin from contact with the coat; hence I term it a "coat-rest." It is preferably narrower and longer than the chin-rest 4, as shown, and in the present instance is extended toward the right of the player farther than the rest 4, although this is not essential.

To attach the attachment described to a violin, I make a square or equivalently shaped hole, I, in the web or plate 6, and form on the outer end of the peg C a projection, $C^1$, adapted to enter and fit snugly in the hole I, and thus support the attachment and prevent it from turning. I also provide the peg C with an enlargement, $C^2$, forming a broad bearing-surface for the back side of the web or plate 6, and this enlargement may, if desired, enter a correspondingly-shaped socket or recess sunk in the back of the web or plate, as shown in Fig. 5.

$C^3$ represents a detachable head, which I apply to the outer end of the peg C, to bear against the outer side of the web or plate 6, and prevent the removal of the attachment. This head may be screwed into the end of the peg C, as shown in Fig. 4, or it may be in the form of a nut screwed onto the threaded end of the peg.

I prefer the former construction, since it does not require an increase in the length of the peg, which would often be objectionable, as it would require an alteration of the case in which the violin is kept. By these means I am enabled to readily apply and remove the attachment, and hold it securely when applied, the peg C entirely supporting the attachment; and as this peg is supported by the stay-block, and is prevented from turning readily by the powerful tension of the strings of the violin, it follows that the attachment has no connection with the resonant portion of the instrument, and is held firmly and rigidly.

It will be seen that the attachment insulates the resonant portions of the violin, all pressure exerted on them being sustained by the non-resonant portion backed by the stay-block; hence there is no disturbance of the vibrations or equilibrium of the violin, and the skilled performer is relieved from all apprehension that the feeling or expression of his performance will be injured by the contact of his chin and clothing with the instrument.

I do not limit myself to any special form of the attachment, nor to any particular means for applying it to the specified portion of a violin.

In Sheet 2 I have shown several modifications. In Figs. 7, 8, 11, 12, and 13 the web or plate 6 is provided with a shank, $p$, square or equivalently shaped, and the peg C is provided with a socket, $h$, formed to receive the shank and hold the same firmly, so that it will not turn therein.

In Figs. 9, 10, 14, 15, 16, and 17 I have shown means whereby the attachment is held in contact with the violin, partly or wholly, by the loop E. The attachment when thus constructed is provided with a base or bar, 1, (formed to fit in a mortise or recess, $r$, cut in the violin,) a space or opening, 2, over the bar 1 for the passage of the loop E, a bridge or guard, 3, projecting over the end of the tail-piece, and the tongues or rests 4 5, attached rigidly to the base 1, and arranged as already described with relation to the body of the violin.

The bar 1 is preferably glued to the recess $r$ when made of a material capable of being so fastened, and is held firmly against the violin by the pressure of the loop E, which is alone sufficient to hold the attachment in the recess. When the attachment thus constructed is not glued, it can be removed at any time by disengaging the loop E from its peg.

The lower tongue or rest, 5, may be made adjustable, as shown in Figs. 11 and 12, to accommodate the attachment to violins of different sizes. In case it is desired to make the attachment serve as a chin-rest only, the tongue or rest 5 may be omitted, as shown in Figs. 16 and 17, the construction being the same in other respects as that already described, and in case it is desired to provide only a coat-rest the attachment may be made as shown in Fig. 13.

I claim as my invention—

1. A chin-rest attachment for a violin, adapted to bear upon or be secured to the non-resonant portion of the instrument backed by the stay-block, and afford a chin-rest or bearing projecting over and isolated from the adjoining resonant portion of the instrument, as set forth.

2. A chin-rest attachment for a violin, adapted to bear upon or be secured to the non-resonant portion of the instrument backed by the stay-block, and afford a chin rest or bearing and a cover or guard for the tail-piece projecting over and isolated from the resonant portion of the instrument and from the tail-piece, as set forth.

3. An insulating attachment for a violin, adapted to bear upon or be secured to the non-resonant portion of the instrument backed by the stay-block, and afford a coat bearing or guard projecting under and isolated from the adjoining resonant portion of the instrument, as set forth.

4. An insulating attachment for a violin, adapted to bear upon or be secured to the non-resonant portion of the instrument backed by the stay-block, and afford two guards projecting, respectively, over and under the adjoining resonant portions of the instrument and isolated from said portions.

5. An insulating attachment, substantially as described, provided with a square or equivalently shaped hole to receive a correspondingly-shaped projection, as set forth.

6. An insulating attachment constructed substantially as described, and provided with means whereby it is detachably connected to the portion of a violin backed by the stay-block.

7. The peg C of a violin, provided near its outer end with a square or equivalently shaped head or projection and a detachable head or nut, as set forth.

8. The combination of the insulating attachment having a hole, I, with the peg C, having the projection adapted to fit in the hole, and the removable head or nut $C^3$, adapted to secure the attachment to the peg.

9. In combination with a violin, an attachment connected by suitable means with the non-resonant portion of the instrument backed by the stay-block, and forming an isolated guard or insulator, arranged as described with reference to the resonant portion or portions of the instrument, as set forth.

10. A chin-rest or insulator for violins, having a base adapted to be attached to the body of the instrument and an isolated tongue or tongues suitably connected to the base and projecting to guard the adjoining resonant portion or portions of the instrument, as set forth.

11. A chin-rest or insulator for violins, having a base adapted to be attached to the body of the instrument, two isolated tongues suitably connected to the base, and a web or plate, 6, connecting the tongues, as set forth.

12. The described chin-rest attachment for violins, formed to bear upon the portion of the instrument backed by the stay-block, and adapted to be held in contact with the instrument by the loop of the tail-piece, as set forth.

13. A chin-rest or insulator for violins, provided with a bar or base, 1, a space, 2, over said bar for the passage of the tail-piece loop, a bridge or guard, 3, for the end of the tail-piece, and a tongue, 4, or tongues 4 5, suitably connected to the bar or base, as set forth.

14. In combination with a violin having a recess or seat over the stay-block, the described attachment having a bar or base adapted to fit in said recess and be held therein by the cord or loop of the tail-piece, as set forth.

In testimony whereof I have signed my name to this specification, in the presence of two subscribing witnesses, this 2d day of April, 1879.

OLE BULL.

Witnesses:
G. W. DANIELL,
H. MACK.